(12) United States Patent
Tsuchikawa

(10) Patent No.: US 11,374,287 B2
(45) Date of Patent: Jun. 28, 2022

(54) ENERGY STORAGE DEVICE

(71) Applicant: GS Yuasa International Ltd., Kyoto (JP)

(72) Inventor: Tomoya Tsuchikawa, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 153 days.

(21) Appl. No.: 16/913,564

(22) Filed: Jun. 26, 2020

(65) Prior Publication Data

US 2020/0328393 A1  Oct. 15, 2020

Related U.S. Application Data

(63) Continuation of application No. 16/083,874, filed as application No. PCT/JP2017/010172 on Mar. 14, 2017, now Pat. No. 10,741,813.

(51) Int. Cl.

| | |
|---|---|
| *H01M 50/46* | (2021.01) |
| *H01G 11/52* | (2013.01) |
| *H01G 11/04* | (2013.01) |
| *H01M 50/409* | (2021.01) |
| *H01M 4/583* | (2010.01) |
| *H01M 10/0525* | (2010.01) |

(Continued)

(52) U.S. Cl.
CPC ............ *H01M 50/46* (2021.01); *H01G 11/04* (2013.01); *H01G 11/52* (2013.01); *H01M 4/583* (2013.01); *H01M 10/056* (2013.01); *H01M 10/0525* (2013.01); *H01M 50/409* (2021.01); *H01G 11/06* (2013.01); *Y02E 60/13* (2013.01); *Y02T 10/70* (2013.01)

(58) Field of Classification Search
None
See application file for complete search history.

(56) References Cited

U.S. PATENT DOCUMENTS 8,597,827 B2 *  12/2013  Kako .................... H01M 4/366
                                                          429/188
2012/0021265 A1    1/2012   Takahashi
(Continued)

FOREIGN PATENT DOCUMENTS

| JP | 2009249488 A | 10/2009 |
|---|---|---|
| JP | 2012028089 | 2/2012 |

(Continued)

OTHER PUBLICATIONS

International Search Report dated Jun. 20, 2017 filed in PCT/JP2017/010172.

*Primary Examiner* — Wyatt P McConnell
(74) *Attorney, Agent, or Firm* — Rankin, Hill & Clark LLP

(57) ABSTRACT

An energy storage device in which a micro-short circuit at the time of heat generation is suppressed is provided. The energy storage device includes: a positive electrode; a negative electrode containing a negative composite layer; and a separator disposed between the positive electrode and the negative electrode. The separator contains a base material layer containing a thermoplastic resin and an inorganic layer formed on the base material layer, the inorganic layer opposes to the positive electrode, the base material layer opposes to the negative electrode, and a ratio of a mass of the base material layer per unit area to a spatial volume of the negative composite layer is 0.26 or more.

5 Claims, 2 Drawing Sheets

(51) Int. Cl.
*H01M 10/056* (2010.01)
*H01G 11/06* (2013.01)

(56) References Cited

U.S. PATENT DOCUMENTS

| | | | |
|---|---|---|---|
| 2012/0288751 | A1 | 11/2012 | Kako |
| 2014/0093761 | A1 | 4/2014 | Sakanaka |
| 2015/0050541 | A1 | 2/2015 | Kinoshita et al. |
| 2015/0056494 | A1* | 2/2015 | Honda ................ H01M 50/411 |
| | | | 429/144 |
| 2015/0303512 | A1 | 10/2015 | Kimura |
| 2016/0133935 | A1 | 5/2016 | Kajita et al. |
| 2016/0372728 | A1 | 12/2016 | Yoshimaru |

FOREIGN PATENT DOCUMENTS

| | | |
|---|---|---|
| JP | 2012226921 A | 11/2012 |
| JP | 2012253010 A | 12/2012 |
| JP | 2013-80636 A | 5/2013 |
| JP | 2013098027 A | 5/2013 |
| JP | 2013109866 A | 6/2013 |
| JP | 2013243031 A | 12/2013 |
| JP | 2014011071 | 1/2014 |
| JP | 2014120214 A | 6/2014 |
| JP | 2014130717 A | 7/2014 |
| JP | 2015026490 A | 2/2015 |
| JP | 2015069957 A | 4/2015 |
| JP | 2016-24970 A | 2/2016 |
| JP | 2016185710 A | 10/2016 |

* cited by examiner

ENERGY STORAGE DEVICE

TECHNICAL FIELD

The technology disclosed herein relates to an energy storage device.

BACKGROUND ART

Conventionally, as a nonaqueous electrolyte secondary battery, which is a type of energy storage device, one described in Patent Document 1 is known. This nonaqueous electrolyte secondary battery includes a positive electrode, a negative electrode, and a separator disposed between the positive electrode and the negative electrode. The negative electrode includes a negative composite layer formed on a surface of a negative electrode current collector made of a metal. In addition, the separator includes a base material layer containing a thermoplastic resin as a main component and an inorganic layer containing a filler as a main component.

Patent Document 1 states the following. "The lithium secondary battery of the present invention includes a positive electrode, a negative electrode, a nonaqueous electrolyte, and a separator enclosed in a hollow columnar battery case and has the following characteristics. The positive electrode includes a positive composite layer containing a positive active material, an electrically conductive auxiliary, and a binder on one or both sides of a current collector. As the positive active material, a lithium-containing composite oxide containing lithium and a transition metal is used. At least part of the lithium-containing composite oxide is a lithium-containing composite oxide containing nickel as a transition metal, and the molar ratio of the total nickel amount relative to the total lithium amount in the entire positive active material is 0.05 to 1.0. The separator includes a porous membrane (I) containing a thermoplastic resin as a main component and a porous layer (II) containing a filler having a heatproof temperature of 150° C. or higher as a main component. The side surface portion of the battery case includes two large-width surfaces that are opposed to each other and each have a larger width than other surfaces in side view. The side surface portion has formed therein a splitting groove that splits in the case where the pressure in the battery case exceeds the threshold. The splitting groove is provided so as to intersect a diagonal line from the large-width surfaces in side view" (paragraph 0009). As a result, "a lithium secondary battery having high capacity together with excellent safety at extremely high temperatures can be provided" (paragraph 0010).

PRIOR ART DOCUMENTS

Patent Documents

Patent Document 1: JP-A-2013-98027

SUMMARY OF THE INVENTION

Problems to be Solved by the Invention

In the battery described in Patent Document 1, a separator including a base material layer containing a thermoplastic resin as a main component and an inorganic layer containing a filler as a main component is used. Therefore, even in the case where the battery temperature excessively increases in a usage form that is usually unforeseen, the separator is likely to be prevented from thermal shrinkage and bringing the positive electrode and the negative electrode into contact with each other. This is presumably because the inorganic layer functions as the backbone of the separator to suppress shrinkage of the separator.

The present inventor has found that in the above configuration, when the battery temperature excessively increases in a usage form that is usually unforeseen, a micro-short circuit occurs between the positive electrode and the negative electrode, and the voltage of the battery may slightly decrease. The reasons therefor are presumably as follows.

Even if the shape of the base material layer is maintained by the inorganic layer, and thermal shrinkage of the separator is thereby suppressed, when the temperature of the base material layer becomes equal to or higher than the melting point, it is concerned that the base material layer may melt. As a result, the molten thermoplastic resin may penetrate into the positive electrode or the negative electrode. In the separator, the part where the molten base material layer has penetrated into the positive electrode or the negative electrode reduces in thickness, and, in some cases, a through-hole may be formed in the base material layer. As a result, it is concerned that due to the through-hole, a micro-short circuit may occur between the positive electrode and the negative electrode.

The technology disclosed herein has been accomplished against the above background. An object thereof is to provide an energy storage device configured such that when the energy storage device generates heat in a usage form that is usually unforeseen, a micro-short circuit at the time of such heat generation is suppressed.

Means for Solving the Problems

An aspect of a technology disclosed in this specification is an energy storage device including: a positive electrode; a negative electrode containing a negative composite layer; and a separator disposed between the positive electrode and the negative electrode. The separator contains a base material layer containing a thermoplastic resin and an inorganic layer formed on the base material layer. The inorganic layer opposes to the positive electrode, and the base material layer opposes to the negative electrode. A ratio of a mass of the base material layer per unit area to a spatial volume of the negative composite layer is 0.26 or more.

Another aspect of the technology disclosed in this specification is an energy storage device including: a positive electrode; a negative electrode containing a negative composite layer; and a separator disposed between the positive electrode and the negative electrode. The separator contains a base material layer containing a thermoplastic resin and an inorganic layer formed on the base material layer. The inorganic layer opposes to the positive electrode, and the base material layer opposes to the negative electrode. A mass of the base material layer per unit area is 0.085 (g/100 cm$^2$) or more, and a density of the negative composite layer is 1.3 (g/cm$^3$) or more.

Advantages of the Invention

According to the technology disclosed in this specification, a micro-short circuit can be suppressed when the energy storage device generates heat.

MODE FOR CARRYING OUT THE INVENTION

Summary of Embodiments

Figure 1:
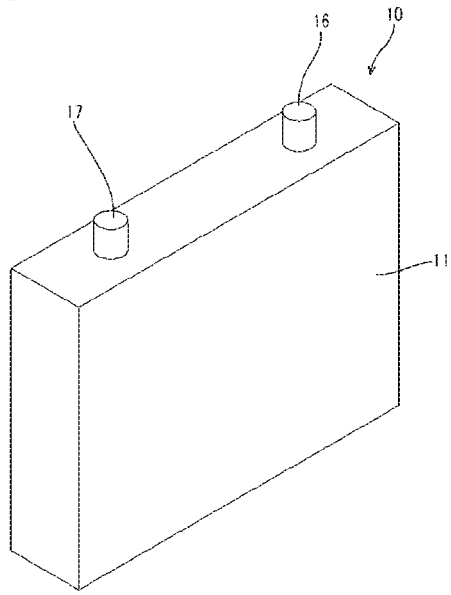
FIG. 1 is a perspective view showing an energy storage device according to Embodiment 1.

An embodiment of a technology disclosed in this specification is an energy storage device including: a positive electrode; a negative electrode containing a negative composite layer; and a separator disposed between the positive electrode and the negative electrode. The separator contains a base material layer containing a thermoplastic resin and an inorganic layer formed on the base material layer. The inorganic layer opposes to the positive electrode, and the base material layer opposes to the negative electrode. A ratio of a mass of the base material layer per unit area to a spatial volume of the negative composite layer is 0.26 or more.

According to the configuration described above, even in the case where the base material layer of the separator melts, the formation of a through-hole in the base material layer is suppressed. As a result, a micro-short circuit in the energy storage device at the time of heat generation can be suppressed.

When the spatial volume of the negative composite layer is too large, presumably, the molten base material layer is likely to penetrate into the negative composite layer, and thus a through-hole is likely to be formed in the base material layer. Meanwhile, when the mass of the base material layer per unit area is too small, presumably, in the case where the base material layer melts, a through-hole is likely to be formed in the base material layer.

Thus, in the technology disclosed herein, the ratio of the mass of the base material layer per unit area to the spatial volume of the negative composite layer is specified to be 0.26 or more. As a result, presumably, even in the case where the base material layer melts, the formation of a through-hole in the base material layer can be suppressed.

As embodiments of the technology disclosed herein, the following modes are preferable.

As an embodiment of the technology disclosed in this specification, in the above-mentioned energy storage device, it can be adopted that the mass of the base material layer per unit area is 0.085 (g/100 cm$^2$) or more.

According to the configuration described above, by letting the mass of the base material layer per unit area be 0.085 (g/100 cm$^2$) or more, even in the case where the base material layer melts, the formation of a through-hole in the base material layer can be further suppressed. As a result, a micro-short circuit in the energy storage device can be further suppressed.

As an embodiment of the technology disclosed in this specification, in the above-mentioned energy storage device, it can be adopted that the ratio of the mass of the base material layer per unit area to the spatial volume of the negative composite layer is 0.31 or more and 0.53 or less.

According to the configuration described above, even in the case where the base material layer melts, the formation of a through-hole in the base material layer can be further suppressed. As a result, a micro-short circuit in the energy storage device can be further suppressed.

An embodiment of the technology disclosed in this specification is an energy storage device including: a positive electrode; a negative electrode containing a negative composite layer; and a separator disposed between the positive electrode and the negative electrode. The separator contains a base material layer containing a thermoplastic resin and an inorganic layer formed on the base material layer, the inorganic layer opposes to the positive electrode, and the base material layer opposes to the negative electrode. A mass of the base material layer per unit area is 0.085 (g/100 cm$^2$) or more, and a density of the negative composite layer is 1.3 (g/cm$^3$) or more.

According to the mode described above, even in the case where the base material layer of the separator melts, the formation of a through-hole in the base material layer is suppressed. As a result, a micro-short circuit in the energy storage device at the time of heat generation can be suppressed.

When the density of the negative composite layer is low, presumably, the molten base material layer is likely to penetrate into the negative composite layer, and thus a through-hole is likely to be formed in the base material layer. Meanwhile, when the mass of the base material layer per unit area is too small, presumably, in the case where the base material layer melts, a through-hole is likely to be formed in the base material layer.

Thus, in the technology disclosed herein, the mass of the base material layer per unit area is specified to be 0.085 (g/100 cm$^2$) or more, and the density of the negative composite layer is specified to be 1.3 (g/cm$^3$) or more. As a result, presumably, even in the case where the base material layer melts, the formation of a through-hole in the base material layer can be suppressed.

As one embodiment of the technology disclosed herein, the energy storage device described above may be configured such that the density of a surface part of the negative composite layer which opposes to the base material layer is larger than the density of a part of the negative composite layer adjacent to a negative electrode current collection foil.

According to the mode described above, the molten base material layer is more unlikely to penetrate into the negative composite layer. As a result, a micro-short circuit in the energy storage device can be even more suppressed.

As one embodiment of the technology disclosed herein, the energy storage device described above may be configured such that the base material layer contains polyethylene as the thermoplastic resin, and the content of polyethylene is 90 mass % or more relative to the mass of the base material layer.

Polyethylene has a lower melting point compared with other thermoplastic resins (e.g., polypropylene), and thus is particularly effective in the case where the technology disclosed herein is applied.

Embodiment 1

Hereinafter, Embodiment 1 will be described with reference to FIG. 1 to FIG. 4. An energy storage device according to Embodiment 1 is mounted on a vehicle main body 50 of an electric vehicle, a hybrid electric vehicle, or the like, for example, and used as a power source for an automobile 100. The energy storage device according to Embodiment 1 is a nonaqueous electrolyte secondary battery 10, more specifically a lithium-ion secondary battery, including a positive electrode 18, a negative electrode 19, a separator 21, and an electrolyte (not shown) housed in a case 11. Incidentally, the nonaqueous electrolyte secondary battery 10 is not limited to a lithium-ion secondary battery, and an arbitrary secondary battery may be selected as necessary.

(Case 11)

As shown in FIG. 1, the case 11 is made of a metal and has a flat rectangular parallelepiped shape. As the metal to form the case 11, an arbitrary metal such as iron, an iron alloy, aluminum, or an aluminum alloy may be selected as necessary.

On the upper surface of the case 11, a positive electrode terminal 16 and a negative electrode terminal 17 are provided to project upwards. The positive electrode terminal 16 is electrically connected to the positive electrode 18 in a known manner in the case 11. In addition, the negative electrode terminal 17 is electrically connected to the negative electrode 19 in a known manner in the case 11.

(Energy Storage Element 20)

Figure 2:
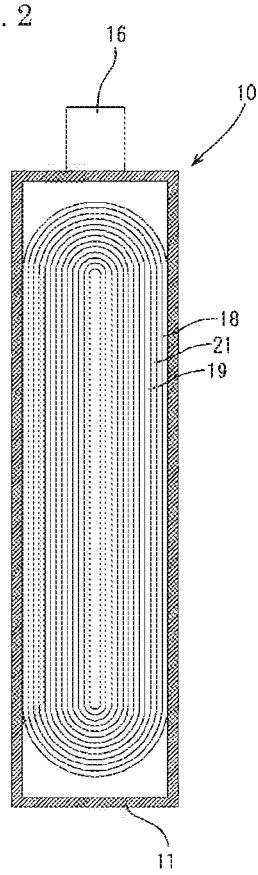
FIG. 2 is a cross-sectional view showing the energy storage device according to Embodiment 1.

As shown in FIG. 2, in the case 11, an energy storage element 20 composed of the positive electrode 18 and the negative electrode 19 rolled with the separator 21 therebetween is housed.

(Positive Electrode 18)

A positive electrode current collection foil is in the form of a foil made of a metal. The positive electrode current collection foil according to this embodiment is made of aluminum or an aluminum alloy. The thickness of the positive electrode current collection foil is preferably 5 µm or more and 20 µm or less.

On one or both sides of the positive electrode current collection foil, a positive composite layer containing a positive active material is formed. In this embodiment, the positive composite layer is formed on both sides of the positive electrode current collection foil. The positive composite layer may contain an electrically conductive auxiliary and a binder.

As the positive active material, a publicly-known material can be appropriately used as long as the positive active material is capable of occluding and releasing a lithium ion. For example, as the positive active material, a polyanion compound selected from $LiMPO_4$, $LiMSiO_4$, $LIMBO_3$ or the like (M is one or more transition metal element selected from Fe, Ni, Mn, Co or the like); a spinel compound such as lithium titanate, lithium manganese or the like, and a lithium transition metal oxide such as $LiMO_2$ (M is one or more transition metal element selected from Fe, Ni, Mn, Co or the like) or the like can be used.

A kind of the electrically conductive auxiliary is not particularly limited. The electrically conductive auxiliary may be metal or non-metal. As the metal electrically conductive auxiliary, a material including a metal element such as Cu, Ni or the like may be used. As a non-metal electrically conductive auxiliary, a carbon material such as graphite, carbon black, acetylene black, ketjen black or the like may be used.

The binder is not particularly limited in kind as long as it is a material stable to a solvent used at manufacturing an electrode and an electrolyte and stable to oxidation-reduction reaction during charge-discharge. For example, a thermoplastic resin such as polytetrafluoroethylene(PTFE), polyvinylidene fluoride (PVDF), polyethylene, polypropylene and a polymer having a rubber elasticity such as ethylene-propylene-diene terpolymer (EPDM), sulfonated EPDM, styrene-butadiene rubber (SBR) and fluorine-contained rubber can be used solely or as a mixture of two or more thereof.

If necessary, a viscosity modifier may be contained in the positive electrode composite layer. As the viscosity modifier, a compound like carboxymethyl cellulose (CMC) or the like can be appropriately selected.

(Negative Electrode 19)

A negative electrode current collection foil is in the form of a foil made of a metal. The negative electrode current collection foil according to this embodiment is made of copper or a copper alloy. The thickness of the negative electrode current collection foil is preferably 5 µm or more and 20 µm or less.

On one or both sides of the negative electrode current collection foil, a negative composite layer containing a negative active material is formed. In this embodiment, the negative composite layer is formed on both sides of the negative electrode current collection foil. The negative composite layer may contain an electrically conductive auxiliary, a binder, and a thickener.

With respect to electrically conductive auxiliaries, binders, viscosity modifiers, and the like that may be used for the negative electrode 19, the same ones as those used for the positive electrode 18 may be suitably selected and used. Thus, the description thereof will be omitted.

As the negative active material, a carbon material, an element capable of alloying with lithium, an alloy, a metal oxide, a metal sulfide, a metal nitride or the like can be used. As an example of the carbon material, hard carbon (non-graphitizable carbon), soft carbon (graphitizable carbon), graphite or the like can be used. As an example of the element capable of alloying with lithium, Al, Si, Zn, Ge, Cd, Sn, Pb or the like can be used. As an example of the alloy, an alloy including a transition metal such as Ni—Si alloy and Ti—Si alloy can be used. As an example of the metal oxide, an amorphous tin oxide such as $SnB_{0.4}P_{0.6}O_{3.1}$ or the like, a tin-silicon oxide such as $SnSiO_3$ or the like, silicon oxide such as SiO or the like, lithium titanate with spinel structure such as $Li_{4+x}Ti_5O_{12}$ or the like can be used. As an example of the metal sulfide, lithium sulfide such as $TiS_2$ or the like, molybdenum sulfide such as $MoS_2$ or the like, iron sulfide such as $FeS$, $FeS_2$, $Li_xFeS_2$ or the like can be used. In the above-mentioned materials, graphite or hard carbon is particularly preferable.

The lower limit of the spatial volume of the negative composite layer is preferably 0.120 ($cm^3$/100 $cm^2$), more preferably 0.140 ($cm^3$/100 $cm^2$), and still more preferably 0.165 ($cm^3$/100 $cm^2$). In addition, the upper limit of the spatial volume of the negative composite layer is preferably 0.380 ($cm^3$/100 $cm^2$), more preferably 0.360 ($cm^3$/100 $cm^2$), and still more preferably 0.330 ($cm^3$/100 $cm^2$). Incidentally, the spatial volume of a negative composite layer means the volume of the space where the negative composite layer is absent per unit area of the negative composite layer.

The lower limit of the porosity of the negative composite layer is preferably 20%, more preferably 23%, and still more preferably 26%. In addition, the upper limit of the porosity of the negative composite layer is preferably 47%, more preferably 45%, and still more preferably 43%.

(Separator 21)

The base material layer of the separator 21 is not particularly limited as long as it contains a thermoplastic resin. As the base material layer of the separator 21, a microporous polyolefin membrane, a woven fabric or a nonwoven fabric made of a synthetic resin fiber or the like can be used. As the microporous polyolefin membranes, polyethylene, polypropylene or a composite membrane thereof can be used. The synthetic resin fiber can be selected from polyacrylonitrile (PAN), polyamide (PA), polyester, polyethylene terephthalate (PET), polyolefin such as polypropylene (PP) or polyethylene (PE), or a mixture thereof. A lower limit of the thickness of the separator 21 is preferably 5 µm, more preferably 8 µm, further preferably 12 µm. An upper limit of the thickness of the separator 21 is preferably 35 µm, more preferably 25 µm, further preferably 20 µm.

On one side of the base material layer of the separator 21, an inorganic layer containing heat-resistant particles and a binder is formed. The inorganic layer opposes to the positive electrode 18. As the heat-resistant particles, those having a weight loss of 5% or less at 500° C. in the atmosphere are preferable. Among them, those having a weight loss of 5% or less at 800° C. are particularly preferable. As such a material, an inorganic compound can be mentioned. As inorganic compounds, the following inorganic substances alone, or alternatively mixtures or composite compounds thereof, can be mentioned: oxide particles such as iron oxide, $SiO_2$, $Al_2O_3$, $TiO_2$, $BaTiO_2$, ZrO, and alumina-silica composite oxide; nitride particles such as aluminum nitride and silicon nitride; poorly soluble ionic crystalline particles such as calcium fluoride, barium fluoride, and barium sulfate; covalent bond crystalline particles such as silicon and diamond; clay particles such as talc and montmorillonite; mineral resource-derived substances such as boehmite, zeolite, apatite, kaolin, mullite, spinel, olivine, sericite, bentonite, and mica, as well as artificial products thereof and the like. In addition, it is also possible that electrically conductive particles, such as metal particles, oxide particles such as $SnO_2$ or tin-indium oxide (ITO), or carbonaceous particles such as carbon black, are surface-treated with a material having electrical insulation properties (e.g., a material constituting the inorganic substance described above) to impart electrical insulation properties, and the resulting particles are used. Among these inorganic compounds, $SiO_2$, $Al_2O_3$, and alumina-silica composite oxide are preferable.

The binder is not limited in kind as long as it is a material stable to an electrolyte. Examples of binders include polyacrylonitrile, polyvinylidene fluoride, vinylidene fluoride-hexafluoropropylene copolymer, polytetrafluoroethylene, polyhexafluoropropylene, polyethylene oxide, polypropylene oxide, polyphosphazene, polysiloxane, polyvinyl acetate, polyvinyl alcohol, polymethyl acrylate, polymethyl methacrylate, polyacrylic acid, polymethacrylic acid, styrene-butadiene rubber, nitrile-butadiene rubber, polystyrene, and polycarbonate. Among them, in terms of electrochemical stability, it is preferable that the binder is polyacrylonitrile, polyvinylidene fluoride, styrene-butadiene rubber, polyhexafluoropropylene, or polyethylene oxide. In particular, polyvinylidene fluoride or styrene-butadiene rubber is more preferable.

The thickness of the inorganic layer is preferably 3 µm or more and 10 µm or less. When the thickness of the inorganic layer is 3 µm or more, a micro-short circuit between the positive electrode and the negative electrode can be suppressed more reliably. In addition, when the thickness of the inorganic layer is 10 µm or less, an excessive increase in the resistance of the energy storage device due to the distance between the positive electrode and the negative electrode can be suppressed.

The mass of the separator per unit area is preferably 0.060 (g/100 cm$^2$) or more, and more preferably 0.085 (g/100 cm$^2$) or more. As a result, a micro-short circuit in the energy storage device can be even more suppressed.
(Ratio of Mass of Base Material Layer Per Unit Area to Spatial Volume of Negative Composite Layer)

The ratio of the mass of the base material layer per unit area to the spatial volume of the negative composite layer is 0.26 or more.

When the spatial volume of the negative composite layer is large, in the case where the base material layer of the separator melts, there is a tendency that the molten base material layer is likely to penetrate into the negative composite layer. As a result, it is concerned that a through-hole is formed in the base material layer of the separator, and, due to the through-hole, a micro-short circuit may occur between the positive electrode 18 and the negative electrode 19.

In addition, when the mass of the base material layer per unit area is small, in the case where the base material layer of the separator melts, a through-hole is likely to be formed in the base material layer. It is concerned that due to the through-hole, a micro-short circuit may occur between the positive electrode 18 and the negative electrode 19.

Thus, the ratio of the mass of the base material layer per unit area to the spatial volume of the negative composite layer is specified to be 0.26 or more. As a result, even in the case where the base material layer melts, the formation of a through-hole in the base material layer can be suppressed. As a result, a micro-short circuit in the energy storage device at the time of heat generation can be suppressed.

It is preferable that the ratio of the mass of the base material layer per unit area to the spatial volume of the negative composite layer is 0.31 or more. As a result, a micro-short circuit in the energy storage device can be even more suppressed.

In addition, it is preferable that the ratio of the mass of the base material layer per unit area to the spatial volume of the negative composite layer is 0.53 or less. As a result, while suppressing a micro-short circuit, the capacity of the energy storage device can be improved.
(Density of Negative Composite Layer)

The density of a negative composite layer means the value obtained by dividing the mass of the negative composite layer by the apparent volume of the negative composite layer. An apparent volume means the volume including the void part. In the case where the negative composite layer is in a sheet shape, the apparent volume can be determined as the product of the thickness and the area of the negative composite layer.

Incidentally, the lower limit of the density of the negative composite layer is preferably 1.3 g/cm$^3$, and may be 1.45 g/cm$^3$ or 1.5 g/cm$^3$. When the density is not less than the lower limit, the molten base material layer is more unlikely to penetrate into the negative composite layer. As a result, a micro-short circuit in the energy storage device can be even more suppressed.

Meanwhile, the upper limit of the density of the negative composite layer is 2.0 g/cm$^3$, for example, and may be 1.8 g/cm$^3$, 1.7 g/cm$^3$, or 1.6 g/cm$^3$. When the density is not more than the upper limit, excellent ion diffusibility can be ensured, making it possible to possess sufficient discharge capacity, for example. Then, it is preferable that the density of a surface part of the negative composite layer which opposes to the base material layer is larger than the density of a part of the negative composite layer adjacent to the negative electrode current collection foil. According to the configuration described above, the molten base material layer is more unlikely to penetrate into the negative composite layer. As a result, a micro-short circuit in the energy storage device can be even more suppressed. Incidentally, the description that "the density of a surface part of the negative composite layer which opposes to the base material layer is larger than the density of a part of the negative composite layer adjacent to the negative electrode current collection foil" specifically means that "in the case where the negative composite layer is bisected in the thickness direction, the density of the surface part of the negative composite layer which opposes to the base material layer is larger as compared with the density of the other part of the negative composite layer adjacent to the negative electrode current collection foil".

(Electrolyte Solution)

As the electrolyte, an electrolyte solution obtained by dissolving an electrolyte salt in a nonaqueous solvent may be used. In the case 11, the positive composite layer, the negative composite layer, and the separator 21 are impregnated with the electrolyte solution. The electrolyte is not limited, and electrolytes generally proposed for use in nonaqueous electrolyte secondary batteries, such as lithium-ion secondary batteries, may be used. Examples of solvents include cyclic carbonates such as propylene carbonate, ethylene carbonate, butylene carbonate, chloroethylene carbonate, and vinylene carbonate; cyclic esters such as γ-butyrolactone and γ-valerolactone; linear carbonates such as dimethyl carbonate, diethyl carbonate, and ethylmethyl carbonate; linear esters such as methyl formate, methyl acetate, and methyl butyrate; tetrahydrofuran and derivatives thereof; ethers such as 1,3-dioxane, 1,4-dioxane, 1,2-dimethoxyethane, 1,4-dibutoxyethane, and methyl diglyme; nitriles such as acetonitrile and benzonitrile; dioxolane and derivatives thereof and ethylene sulfide, sulfolane, sultone, and derivatives thereof. They may be used alone, and it is also possible to use a mixture of two or more kinds, for example. Incidentally, known additives may also be added to the electrolyte.

As the electrolyte salt, for example, inorganic ionic salts containing one of lithium (Li), sodium (Na), and potassium (K) such as $LiClO_4$, $LiBF_4$, $LiAsF_6$, $LiPF_6$, LiSCN, LiBr, LiI, $Li_2SO_4$, $Li_2B_{10}Cl_{10}$, $NaClO_4$, NaI, NaSCN, NaBr, $KClO_4$, and KSCN; and organic ionic salts such as $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $(CH_3)_4NBF_4$, $(CH_3)_4NBr$, $(C_2H_5)_4NClO_4$, $(C_2H_5)_4NI$, $(C_3H_7)_4NBr$, $(n-C_4H_9)_4NClO_4$, $(n-C_4H_9)_4NI$, $(C_2H_5)_4N$-maleate, $(C_2H_5)_4N$-benzoate, $(C_2H_5)_4N$-phthalate, lithium stearylsulfonate, lithium octylsulfonate, and lithium dodecylbenzenesulfonate, can be used. These ionic compounds may be used singly or in combination of two or more thereof.

It is preferable to use $LiBF_4$ and a lithium salt including perfluoroalkyl group such as $LiN(C_2F_5SO_2)_2$ as a mixture because a viscosity of the electrolyte can be decreased, thereby a low temperature characteristic can be enhanced and a self-discharge can be suppressed.

In addition, it is also possible to use an ambient temperature molten salt or an ionic liquid as the electrolyte.

(Other Constituent Members)

As other constituent members of the energy storage device, a terminal and the like can be mentioned. In the energy storage device of the present invention, as these constituent members, those conventionally used may be suitably employed.

(Power Storage Apparatus 40)

Figure 3:
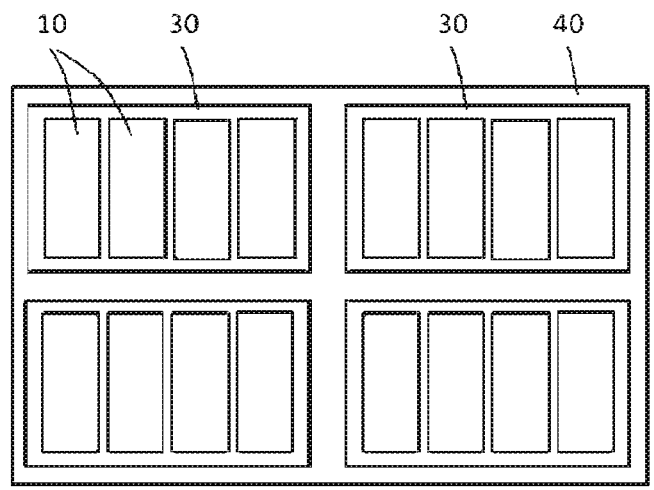
FIG. 3 is a schematic view showing an energy storage apparatus in which the energy storage device according to Embodiment 1 is provided.
Figure 4:
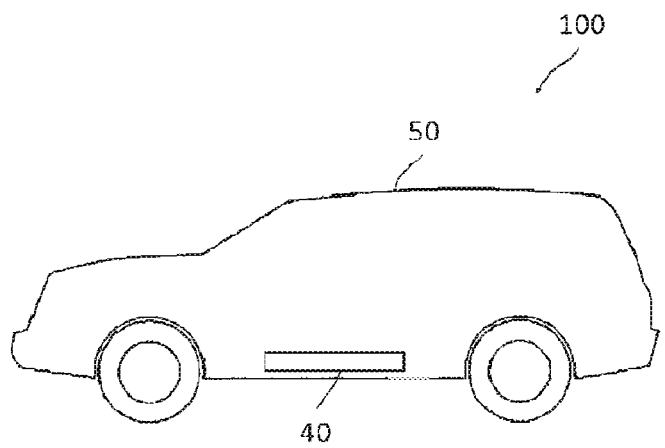
FIG. 4 is an automobile with the energy storage apparatus in which the energy storage device according to Embodiment 1.

One or more of the energy storage devices of the present invention may be used to constitute a power storage apparatus. FIG. 3 shows one embodiment of the energy storage apparatus. The power storage apparatus 40 includes a plurality of power storage units 30. Each energy storage unit 30 includes a plurality of nonaqueous electrolyte secondary batteries 10. The power storage apparatus 40 can be mounted, as shown in FIG. 4, as a power source for an automotive 100, such as an electric vehicle (EV), a hybrid electric vehicle (HEV), or a plug-in hybrid electric vehicle (PHEV).

Examples

Hereinafter, the present invention will be described in detail based on examples and comparative examples. The present invention is not limited to the following examples by any means. Incidentally, in the present invention, as described later, the resistance between a positive electrode and a negative electrode was measured to examine the effects of the present invention.

(Positive Electrode)

The positive electrode was prepared as follows. 90 parts by mass of a lithium composite oxide represented by compositional formula $LiNi_{1/3}Mn_{1/3}Co_{1/3}O_2$ as a positive active material, 5 parts by mass of polyvinylidene fluoride as a binder, and 5 parts by mass of acetylene black as an electrically conductive auxiliary were mixed. N-methylpyrrolidone (NMP) was suitably added thereto to form the mixture into a paste, thereby preparing a positive composite. The positive composite was applied to both sides of a positive electrode current collection foil formed of an aluminum foil having a thickness of 15 μm and dried, thereby forming a positive composite layer. Subsequently, pressure was applied using a roll press, thereby preparing a positive electrode. On the positive electrode, a region where the positive composite layer was not formed, and the positive electrode current collection foil was exposed, was provided (positive composite layer-absent region), and a positive electrode lead was connected to the region where the positive electrode current collection foil was exposed.

(Negative Electrode)

The negative electrode was prepared as follows. 95 parts by mass of graphite as a negative active material, 3 parts by mass of styrene-butadiene rubber (SBR) as a binder, and 2 parts by mass of carboxymethylcellulose (CMC) were mixed. Water was suitably added thereto to form the mixture into a paste, thereby preparing a negative composite. The negative composite was applied to both sides of a negative electrode current collection foil formed of a copper foil having a thickness of 10 μm and dried, thereby forming a negative composite layer. Subsequently, pressure was applied using a roll press, thereby preparing a negative electrode. On the negative electrode, a region where the negative composite layer was not formed, and the negative electrode current collection foil was exposed, was provided (negative composite layer-absent region), and a negative electrode lead was connected to the region where the negative electrode current collection foil was exposed.

The conditions for pressure application to the negative electrode and the coating weight of the negative electrode mixture were changed, thereby preparing, as shown in the following Table 1, several negative electrodes having different porosities of the negative composite layer and different spatial volumes of the negative composite layer. Incidentally, in Table 1, the porosity of the negative composite layer is indicated as "negative electrode porosity (%)", the coating weight of the negative electrode mixture as "negative electrode coating weight (g/100 $cm^2$)", and the spatial volume of the negative composite layer as "negative electrode spatial volume ($cm^3$/100 $cm^2$)".

(Separator)

As the separator, a separator having an inorganic layer formed on the surface of a polyolefin microporous membrane to serve as a base material layer or a separator composed only of a polyolefin microporous membrane to serve as a base material layer was used. The polyolefin microporous membrane contains polyethylene and polypropylene as thermoplastic resins. The content of polyethylene was 95 mass %, and the content of polypropylene was 5 mass %. The thickness of the polyolefin microporous membrane (base material layer) was 16 μm. In addition, with respect to the mass of the polyolefin microporous membrane (base material layer) per unit area, as shown in Table 1, membranes having different masses were used. The inorganic layer is formed by applying a composite for inorganic layer formation, which is obtained by mixing 95 mass % of alumina particles ($Al_2O_3$) as an inorganic compound, 3 mass % of polyacrylic acid as a binder, and 2 mass % of carboxymethylcellulose as a thickener, and suitably adding water thereto to form the mixture into a paste, to a surface of the base material layer, followed by drying. The thickness of the inorganic layer was 5 μm, and the particle size (D50) of the alumina particles was 0.7 μm.

Using the above constituent elements, the resistance was measured under the conditions shown in Table 1.

(Measurement of Negative Electrode Porosity)

The porosity of the negative composite layer (negative electrode porosity) was determined as follows. The thickness of the negative composite layer and the mass of the negative composite layer per unit area were measured to calculate the negative composite layer density [A (g/cm$^3$)], and, using the negative composite layer true density [B (g/cm$^3$)] calculated from the true density of each material constituting the negative composite layer, the porosity was calculated from the following equation. Incidentally, the thickness of the negative composite layer was measured using a micrometer.

Negative electrode porosity (%)=$[1-(A/B)]\times 100$

Incidentally, the above negative electrode porosity may also be calculated as a value measured by "Mercury Intrusion Method" in accordance with JIS-R1655 (2003), more specifically as the percentage of voids measured by the mercury intrusion method based on the following relational expression. D=−4σ cos θ/P (D: pore diameter, P: mercury pressure, σ: surface tension, θ: contact angle), provided that θ=130° and σ=484 mN/cm. Specifically, measurement is performed using a mercury porosimeter ("WIN9400" manufactured by Micrometrics) with the pore size measurement range being 0.005 to 20 μm.

(Measurement of Negative Electrode Spatial Volume)

The thickness of the negative composite layer was measured, and the volume of the negative composite layer per unit area [C (cm$^3$/100 cm$^2$)] was calculated. The spatial volume of the negative composite layer (negative electrode spatial volume) was calculated from the following equation using the volume of the negative composite layer per unit area [C (cm$^3$/100 cm$^2$)] and the porosity of the negative composite layer [D (%)]. Incidentally, the thickness of the negative composite layer was measured using a micrometer.

Negative electrode spatial volume(cm$^3$/100 cm$^2$)=$(D/100)\times C$ (Measurement of Mass of Base Material Layer Per Unit Area)

The base material layer was cut to a 10-cm square (10 cm×10 cm), and the mass of the base material layer was measured. The value of the mass was defined as the mass of the base material layer per unit area.

(Measurement of Resistance)

Using the positive electrode, negative electrode, and separator described above, the resistance was measured by the following method.

The positive electrode (30 mm×30 mm) and the negative electrode (32 mm×32 mm) were stacked with the separator (40 mm×40 mm) therebetween. The separator was disposed between the positive electrode and the negative electrode in such a manner that the inorganic layer of the separator opposed to the positive electrode. The layered element of the positive electrode, the separator, and the negative electrode was sandwiched between two plates made of SUS and pressed with a torque of 0.5 N·m.

The layered element of the positive electrode, the separator, and the negative electrode was stored in an oven set at 200° C. for 30 minutes, and the resulting resistance was measured. The resistance of the layered element was measured using a resistance meter RM3545 (manufactured by Hioki E.E. Corporation) connected to the positive electrode lead and the negative electrode lead.

By comparing the resistances measured as described above, whether a micro-short circuit has been suppressed can be judged. That is, when the resistance is large, it is estimated that the formation of a through-hole in the base material layer has been suppressed, and conduction between the positive electrode and the negative electrode has been inhibited. That is, this indicates the suppression of a micro-short circuit between the positive electrode and the negative electrode.

The results of the above measurements are shown in Table 1.

TABLE 1

| | Negative electrode | | | | Separator | | | Mass of base material layer per unit area/ negative electrode spatial volume (g/cm$^3$) | Resistance (Ω/cm$^2$) |
| --- | --- | --- | --- | --- | --- | --- | --- | --- | --- |
| | Negative electrode porosity (%) | Negative electrode coating weight (g/100 cm$^2$) | Negative composite layer density (g/cm$^3$) | Negative electrode spatial volume (cm$^3$/100 cm$^2$) | Mass of base material layer per unit area (g/100 cm$^2$) | Presence/ absence of inorganic layer | Thickness of inorganic layer (μm) | | |
| Example 1 | 26 | 1.01 | 1.594 | 0.165 | 0.085 | Present | 5 | 0.52 | 25.6 |
| Example 2 | 30 | 0.97 | 1.508 | 0.192 | 0.085 | Present | 5 | 0.44 | 20.2 |
| Example 3 | 37 | 1.01 | 1.357 | 0.275 | 0.085 | Present | 5 | 0.31 | 22.7 |
| Example 4 | 39 | 1.01 | 1.314 | 0.300 | 0.085 | Present | 5 | 0.28 | 19.7 |
| Example 5 | 41 | 1.01 | 1.271 | 0.326 | 0.085 | Present | 5 | 0.26 | 19.9 |
| Comparative Example 1 | 49 | 1.01 | 1.099 | 0.450 | 0.085 | Present | 5 | 0.19 | 12.2 |
| Comparative Example 2 | 49 | 1.18 | 1.099 | 0.526 | 0.085 | Present | 5 | 0.16 | 12.1 |
| Example 6 | 30 | 0.97 | 1.508 | 0.192 | 0.060 | Present | 5 | 0.31 | 15.2 |
| Example 7 | 30 | 0.97 | 1.508 | 0.192 | 0.101 | Present | 5 | 0.53 | 40.3 |
| Comparative Example 3 | 30 | 0.97 | 1.508 | 0.192 | 0.085 | Absent | 0 | 0.44 | 1.7 |

(Results and Discussion)

In Comparative Example 1, the negative electrode porosity is 49(%), and the negative electrode spatial volume is as large as 0.450 (cm$^3$/100 cm$^2$). Therefore, the value of the mass of the base material layer per unit area relative to the negative electrode spatial volume is as small as 0.19 (g/cm$^3$). In Comparative Example 1, the resistance was as small as 12.2 (Ω/cm$^2$). This is presumably because when the layered element of the positive electrode, the separator, and the negative electrode was heated, the base material layer melted and penetrated into the negative composite layer too much, resulting in a decrease in resistance. As a result, in the energy storage device of Comparative Example 1, a micro-short circuit is likely to occur. In addition, in Comparative Examples 2, similarly to Comparative Example 1, the negative electrode spatial volume is as large as 0.526 (cm$^3$/100 cm$^2$), and the value of the mass of the base material layer per unit area relative to the negative electrode spatial volume is as small as 0.16 (g/cm$^3$). As a result, also in the energy storage device of Comparative Example 2, a micro-short circuit is likely to occur.

In contrast, in Example 1 to Example 7, in which the value of the mass of the base material layer per unit area relative to the negative electrode spatial volume is 0.26 (g/cm$^3$) or more, the resistance is 15.2 (Ω/cm$^2$) or more, which is larger than in Comparative Example 1 and Comparative Example 2. This is presumably because penetration of the molten base material layer into the negative composite layer was suppressed. As a result, in the energy storage devices of Example 1 to Example 7, a micro-short circuit is suppressed.

In Comparative Example 3, the resistance is as small as 1.7 (Ω/cm$^2$). The separator of Comparative Example 3 has no inorganic layer formed. As a result, presumably, the separator underwent thermal shrinkage at the time of heating and became unable to maintain its shape, resulting in a decrease in resistance. As a result, in the energy storage device of Comparative Example 3, a micro-short circuit is likely to occur.

In contrast, in Example 2, although the value of the mass of the base material layer per unit area relative to the negative electrode spatial volume is the same as in Comparative Example 3, the resistance shown was as high as 20.2 (Ω/cm$^2$). This is presumably because the shape of the separator was maintained by the inorganic layer, whereby the resistance was kept high.

Example 3 and Example 6 will be compared. In Example 3, the value of the mass of the base material layer per unit area relative to the negative electrode spatial volume is 0.31 (g/cm$^3$), and also in Example 6, the value of the mass of the base material layer per unit area relative to the negative electrode spatial volume is 0.31 (g/cm$^3$).

Meanwhile, in Example 3, the mass of the base material layer per unit area is 0.085 (g/100 cm$^2$), and the resistance is 22.7 (Ω/cm$^2$). In Example 6, the mass of the base material layer per unit area is 0.060 (g/100 cm$^2$), and the resistance is 15.2 (Ω/cm$^2$). This is presumably because the mass of the base material layer per unit area of Example 3 was 0.085 (g/100 cm$^2$) or more, and thus the formation of a through-hole in the base material layer was even more suppressed.

In Examples 1 to 3, the mass of the base material layer per unit area is 0.085 (g/100 cm$^2$), and the value of the mass of the base material layer per unit area relative to the negative electrode spatial volume is 0.31 (g/cm$^3$) or more. In Examples 1 to 3, the resistance is 20.2 (Ω/cm$^2$) or more, and thus a micro-short circuit is even more suppressed.

In Example 7, the mass of the base material layer per unit area is 0.101 (g/100 cm$^2$), and the value of the mass of the base material layer per unit area relative to the negative electrode spatial volume is 0.53 (g/cm$^3$), which are both large. In Example 7, the resistance is 40.3 (Ω/cm$^2$), and a micro-short circuit is even more suppressed.

In Examples 1 to 7, the content of polyethylene in the base material layer is 90 mass % or more. The melting point of polyethylene is lower as compared with polypropylene. Therefore, in the case where 90 mass % or more of polyethylene is contained in the base material layer, the application of the technology described herein is particularly effective.

As described above, according to the technology disclosed herein, a micro-short circuit in an energy storage device at the time of heat generation can be suppressed.

Other Embodiments

The technology disclosed herein is not limited to the embodiments explained in the descriptions and drawings above, and the following embodiments, for example, are also included in the scope of the technology disclosed herein.

(1) The energy storage device according to this embodiment is configured to be prismatic, but is not limited thereto, and may also have a cylindrical shape or a shape in which an energy storage element is enclosed in an enclosure body formed of a laminate film. As necessary, an arbitrary shape may be employed.

(2) The energy storage device according to this embodiment is a secondary battery (nonaqueous electrolyte secondary battery), but is not limited thereto, and may also be a primary battery, a capacitor, or the like. An arbitrary energy storage device may be employed.

(3) The electrolyte solution may also be in gel form.

INDUSTRIAL APPLICABILITY

The present invention relates to an energy storage device and is capable of suppressing a micro-short circuit in the energy storage device at the time of heat generation, and thus can be effectively used for automotive power sources for electric vehicles and the like, power sources for electronic devices, power sources for electricity storage, and the like.

DESCRIPTION OF REFERENCE SIGNS

10: Energy storage device
11: Case
16: Positive electrode terminal
17: Negative electrode terminal
18: Positive electrode
19: Negative electrode
20: Energy storage element
21: Separator
30: Energy storage unit
40: Energy storage apparatus
50: Vehicle main body
100: Automobile

The invention claimed is:

1. An energy storage device comprising:
a positive electrode;
a negative electrode containing a negative composite layer; and
a separator disposed between the positive electrode and the negative electrode, wherein the separator contains a base material layer containing a thermoplastic resin and an inorganic layer formed on the base material layer, the inorganic layer opposes to the positive electrode, the base material layer opposes to the negative electrode, a mass of the base material layer per unit area is 0.085 (g/100 cm$^2$) or more, and a porosity of the negative composite layer is 47% or less.

2. The energy storage device according to claim 1, wherein a density of a surface part of the negative composite layer which opposes to the base material layer is larger than a density of a part of the negative composite layer adjacent to a negative electrode current collection foil.

3. The energy storage device according to claim 1, wherein the base material layer contains polyethylene as the thermoplastic resin, and a content of polyethylene is 90 mass % or more relative to a mass of the base material layer.

4. An energy storage device comprising:

a positive electrode;

a negative electrode containing a negative composite layer; and a separator disposed between the positive electrode and the negative electrode, wherein the separator contains a base material layer containing a thermoplastic resin and an inorganic layer formed on the base material layer, the inorganic layer opposes to the positive electrode, the base material layer opposes to the negative electrode, and a ratio of a mass of the base material layer per unit area to a porosity of the negative composite layer is 0.20 (g/100 cm$^2$) or more.

5. The energy storage device according to claim 4, wherein a mass of the base material layer per unit area is 0.085 (g/100 cm$^2$) or more.

* * * * *